US 8,605,311 B2

(12) United States Patent
Wang et al.

(10) Patent No.: US 8,605,311 B2
(45) Date of Patent: Dec. 10, 2013

(54) METHODS AND SYSTEMS FOR PROVIDING DEVICE SPECIFIC PRINT OPTIONS TO REMOTE PRINTING SERVICES

(75) Inventors: Yao-Tian Wang, Sunnyvale, CA (US); Hitoshi Sekine, Los Altos, CA (US); Soiba Mohammad, Winnetka, CA (US)

(73) Assignee: Ricoh Company, Ltd., Tokyo (JP)

( * ) Notice: Subject to any disclaimer, the term of this patent is extended or adjusted under 35 U.S.C. 154(b) by 749 days.

(21) Appl. No.: 12/539,698

(22) Filed: Aug. 12, 2009

(65) Prior Publication Data

US 2011/0037995 A1  Feb. 17, 2011

(51) Int. Cl.
  *G06F 3/12* (2006.01)
(52) U.S. Cl.
  USPC .................... 358/1.15; 358/1.13; 358/1.14
(58) Field of Classification Search
  USPC ........................ 358/1.13, 1.14, 1.15
  See application file for complete search history.

(56) References Cited

U.S. PATENT DOCUMENTS

| 2003/0133150 A1* | 7/2003 | Tamai et al. | 358/1.15 |
| 2004/0239986 A1* | 12/2004 | Wise | 358/1.15 |
| 2005/0206917 A1* | 9/2005 | Ferlitsch | 358/1.5 |
| 2008/0275994 A1* | 11/2008 | Wu | 709/228 |
| 2009/0147309 A1* | 6/2009 | Nagashima | 358/1.15 |
| 2011/0026073 A1* | 2/2011 | Wu | 358/1.15 |

FOREIGN PATENT DOCUMENTS

GB   2365599   2/2002

* cited by examiner

*Primary Examiner* — Jacky X Zheng
(74) *Attorney, Agent, or Firm* — Duft Bornsen & Fettig, LLP (57) ABSTRACT

Systems and methods are disclosed for enabling remote printing services to consistently obtain and utilize print capabilities of printing devices across a wide variety of connection topologies. A client device retrieves the print capabilities from one or more printing devices selected for printing a document. The document and the print capabilities are transmitted to a web print service for rending the document. The web print service generates a print job based on the document and the print capabilities of the printing device selected for printing the document. The web print service provides the print job to the selected printing device for subsequent printing.

20 Claims, 5 Drawing Sheets

METHODS AND SYSTEMS FOR PROVIDING DEVICE SPECIFIC PRINT OPTIONS TO REMOTE PRINTING SERVICES

BACKGROUND

1. Field of the Invention

The invention relates generally to providing remote printing services to client devices, and more specifically, for providing device specific print options to remote printing services for printing devices.

2. Discussion of Related Art

In a printing environment, various print job options exist when printing a document on a printing device. For example, a user may select various print job options such as duplexing, stapling, sorting, and single or double sided printing, etc., for a document to be printed. After the user selects the various print job options, a print job is generated based on the document to be printed and the various user selected print job options. The generated print job is subsequently submitted to a printing device for printing on some form of printable media.

Typically, the available print options for a specific printing device are set up when a printing device is installed on a client device (i.e., a driver is installed for the printing device and a print capabilities file is stored on the client). For example, when a print driver is installed on a computer, various print options for the printing device may be specified by a user, such as what paper trays are available, the size of the paper in each tray, the amount of memory within the printing device, etc. Also, the print capabilities file of the printing device may be stored on the computer for later use. The print capabilities file allows the client device to consistently identify the print capabilities of a specific printing device.

When a print job for the printing device is subsequently generated using the printer driver and the print capabilities file, the various print options for the print job are converted into device specific commands for the printing device. In many cases, the device specific commands are unique to a particular vender or model of the printing device.

Problems may arise, however, when print jobs are generated for print devices and the print capabilities for the target printer are not known. For example, various web print services exist which allow client devices to transfer the process of print job generation to a server operating the web print services. Such services may be utilized, for example, when the client device either lacks the rendering capability for the print job or is simply too limited in performance for rendering the print job on the client device in a reasonable amount of time. In such cases, the server executing a web print service renders the print job for the client. In some cases, however, the web print service may not consistently or correctly identify the complete print capabilities of a specific target printing device for the print job. Problems may arise when the server executing the web print service does not have a direct connection to the printing device to obtain the actual, complete print capabilities of a particular printing device. In such cases, the web print service may only be able to offer a generic set of print options available to or common to an entire family of print devices, thus limiting the functionality of the web print service when generating a print job.

Thus it is an ongoing challenge to consistently obtain and utilize print capabilities of a printing device across a wide variety of connection topologies.

SUMMARY

The present invention solves the above and other problems, thereby advancing the state of the useful arts, by providing systems and methods for remote print services to consistently obtain and utilize print capabilities of printing devices across a wide variety of connection topologies.

One aspect hereof provides a method for printing a print job on a printing system, where the printing system includes a client device and a web print service. According to the method, a request is transmitted for print capabilities of a printing device from the client device to the printing device. A response is received at the client device from the printing device, where the response includes the print capabilities. Document data and the print capabilities are transmitted from the client device to the web printing service. The print job is rendered at the web printing service based on the document data and the print capabilities. The print job is provided to the printing device and subsequently is printed.

Another aspect hereof provides for a printing system. The printing system includes a web print server, and a client device coupled with the web print server. The client device is operable to transmit a request to a printing device for the print capabilities of the printing device. The client device is further operable to receive a response from the printing device for the print capabilities of the printing device. The client device is further operable to transmit document data and the print capabilities to the web print server. The web print server is operable to render a print job for the printing device based on the document data and the print capabilities and is further operable to provide the print job to the printing device for subsequent printing on the printing device.

BRIEF DESCRIPTION OF THE DRAWINGS

The same reference number represents the same element or same type of element on all drawings.

DETAILED DESCRIPTION OF THE DRAWINGS

FIGS. 1 through 6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
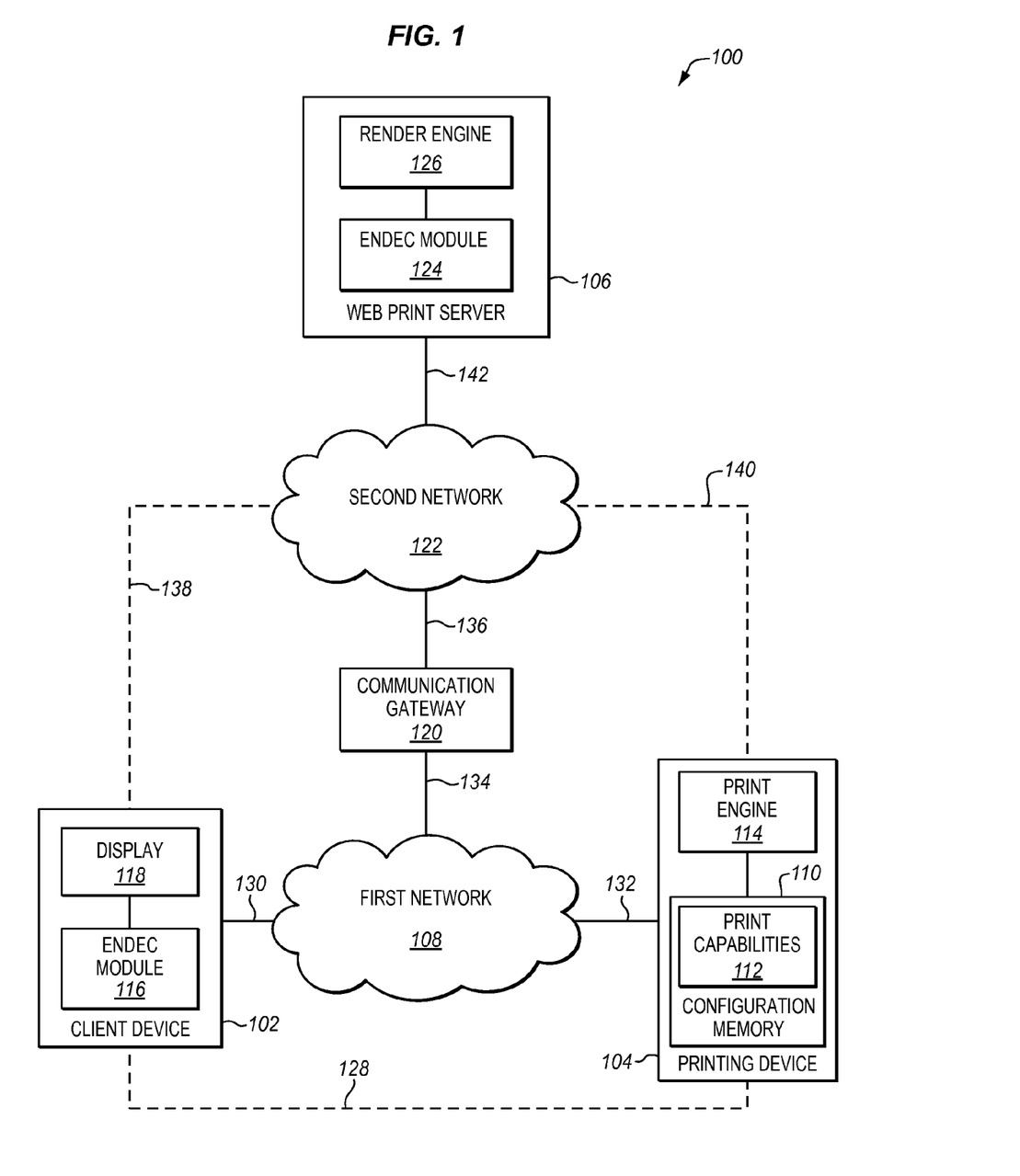
FIG. 1 is a block diagram of an exemplary printing system in accordance with features and aspects disclosed herein for consistently obtaining and utilizing print capabilities of a printing device across a wide variety of connection topologies.

FIG. 1 is a block diagram of an exemplary printing system 100 in accordance with features and aspects disclosed herein for utilizing print capabilities of a printing device when rendering print jobs by a web print server.

Printing system 100 includes a client device 102 and a web print server 106. Printing system 100 may additionally include in some embodiments a communication gateway 120 and a printing device 104. Although printing system 100 has been illustrated using specific elements, one skilled in the art will recognize that printing system 100 may include more or fewer elements as a matter of design choice. Additionally, one skilled in the art will recognize that printing system 100 may include any number of circuits, programmable logic devices, processors, memory devices, printing devices, client devices, and web print servers operable to perform the functionality disclosed hereinafter.

In printing system 100, client device 102 is operable to obtain print capabilities 112 from printing device 104 and to provide print capabilities 112 to web print server 106. After obtaining print capabilities 112, web print server 106 may utilize print capabilities 112 when rendering a print job for printing device 104. Because client device 102 acts as an intermediary between web print server 106 and printing device 104, various issues which may arise from different connection topologies are alleviated. For example, a signal path 140 between printing device 104 and web print server 106 may not exist. Thus, a communication path may not directly exist between web print server 106 and printing device 104 for consistently obtaining and utilizing the actual, complete print capabilities of a particular printing device 104 when rending a print job for printing device 104.

Client device 102 of printing system 100 includes any device operable to communicate with printing device 104 and web print server 106. Client device 102 may include a number of devices, such as personal digital assistants (PDAs), mobile and/or network enabled telephones, portable computers, and the like. Client device 102 may optionally include display 118. Display 118 may, for example, provide a user (not shown) an interface for displaying various print options for printing device 104 prior to printing. In FIG. 1, client device 102 may be coupled with printing device 104 in a number of ways. One exemplary embodiment includes signal path 128. Signal path 128 is an optional embodiment of printing system 100 which includes a direct connection between client device 102 and printing device 104. Signal path 128 may include a wired connection (e.g., USB, parallel, serial) or a wireless connection (e.g., 802.11, Bluetooth). In another exemplary embodiment, client device 102 is coupled with printing device 104 through a first network 108, and network connections 130 and 132. In like manner, network connections 130 and 132 may be wired or wireless connections.

Client device 102 may be coupled with web print server 106 in a number of ways. One exemplary embodiment couples client device 102 across signal path 138 to a second network 122. Another exemplary embodiment includes a communication path between second network 122 and first network 108 through a communication gateway 120. Similar to network connection 130, network connection 134 between first network 108 and gateway 120 may be a wired connection or a wireless connection. In like manner, network connection 136 between second network 122 and gateway 120 may be wired or wireless.

Printing device 104 of printing system 100 includes any device operable to print a print job, such as a printer, a network enabled copier, a multifunction device, and the like. Printing device 104 additionally includes print capabilities 112. Print capabilities 112 may reside within a configuration memory 110 of printing device 104. Print capabilities 112 may include a variety of print configuration information for printing device 104, such as the type and number of sheets of paper available for printing using different paper trays of printing device 104, various finishing options for a print job such as duplexing, stapling, sorting, etc. Print capabilities 112 may additionally include information about printing device 104, such as an amount of memory available for processing a print job within printing device 104, an amount and type of toner or color cartridges available for printing the print job, resolutions available for printing the print job, a model name, an Institute of Electrical and Electronic Engineer ID (IEEE-ID), and the types of page description languages (PDLs) supported by printing device 104. Printing device 104 additionally includes a print engine 114. Print engine 114 comprises any device operable to transfer print data to a printable medium, such as a thermal printing head, a laser print engine, and an ink ejection droplet system.

Web print server 106 of printing system 100 includes any device operable to receive document data from client device 102 and render document data into a print job for printing on printing device 104. Web print server 106 is coupled with second network 122 through network connection 142. In some embodiments, web print server 106 may include a computer operating a web application service (WAS) for web based printing. In other embodiments, web print server 106 resides within, and is accessible on, the internet using a public Internet Protocol (IP) address. Web print server 106 additionally includes a render engine 126. Render engine 126 may, for example, process document data and print options to generate a print job for printing device 104.

Web print server 106 may be coupled with printing device 104 in a number of ways. One exemplary embodiment includes utilizing second network 122 and an optional signal path 140 for a direct connection. For example, printing device 104 may have a public IP address and second network 122 may be the Internet. Thus, web print server 106 may render and provide print jobs to printing device 104 directly over signal path 140. Another exemplary embodiment includes coupling through gateway 120 to first network 108. For example, communication gateway 120 may forward rendered print jobs from web print server 106 to printing device 104. Yet another exemplary embodiment includes utilizing client device 102 as an intermediary print job handler for web print server 106. For example, web print server 106 may transmit rendered print jobs to client device 102 (using optional signaling pathway 138 or through gateway 120). Client device 102 may then forward the print job to printing device 104.

As discussed above, client device 102 may wish to print document data on printing device 104 using web print server 106. Client device 102 may also wish to preview print data for the document data on a display 118 of client device 102. In either case, client device 102 may utilize web print server 106 for this functionality for a number of reasons. One reason may be that client device 102 may have limited functionality regarding printing document data on printing device 104. Such limited functionality may include not having a print driver installed, not having a suitable rendering engine to generate the print job, or not being well suited to printing the document data on printing device 104.

When web print server 106 renders the document data for client device 102 into a print job, print capabilities 112 are utilized when generating the print job for printing device 104. For example, a user of client device 102 may wish to include various print job options (e.g., a selected set of print capabilities 112) for the print job, such as stapling, duplexing, sorting, the type of paper used, or other options based on specific print capabilities 112 of printing device 104. In some cases, web print server 106 may not have access to print capabilities 112. For example, printing device 104 may be within first network 108 which makes print capabilities 112 inaccessible to web print server 106 (e.g., when optional signal path 140 is not available). In other cases, web print server 106 may be operable to access printing device 104, but may not have access to protocols supporting the retrieval of print capabilities 112 directly from printing device 104. For example, communication gateway 120 may allow limited types of communications to occur between web print server 106 and printing device 104, such as a printing port, but not allow other types of communication requests (such as querying printing device 104 for print capabilities 112). Because web print server 106 may not have access to print capabilities 112 of printing device 104, web print server 106 may not be able to consistently obtain and utilize print capabilities 112 when rendering a print job for printing device 104 regardless of the connectivity between web print server 106 and printing device 104.

To alleviate this problem, client device 102 may act as an intermediary agent between web print server 106 and printing device 104. In this capacity, client device 102 may transmit a request to printing device 104 for print capabilities 112. Responsive to receiving print capabilities 112 from printing device 104, client device 102 may transmit print capabilities 112 to web print server 106. Web print server 106 may then render the print job using document data and print job options, and subsequently, provide the print job to printing device 104 for printing. When client device 102 acts in this capacity, print capabilities 112 are consistently obtained and utilized by web print server 106 when rendering print jobs for printing device 104.

Figure 2:
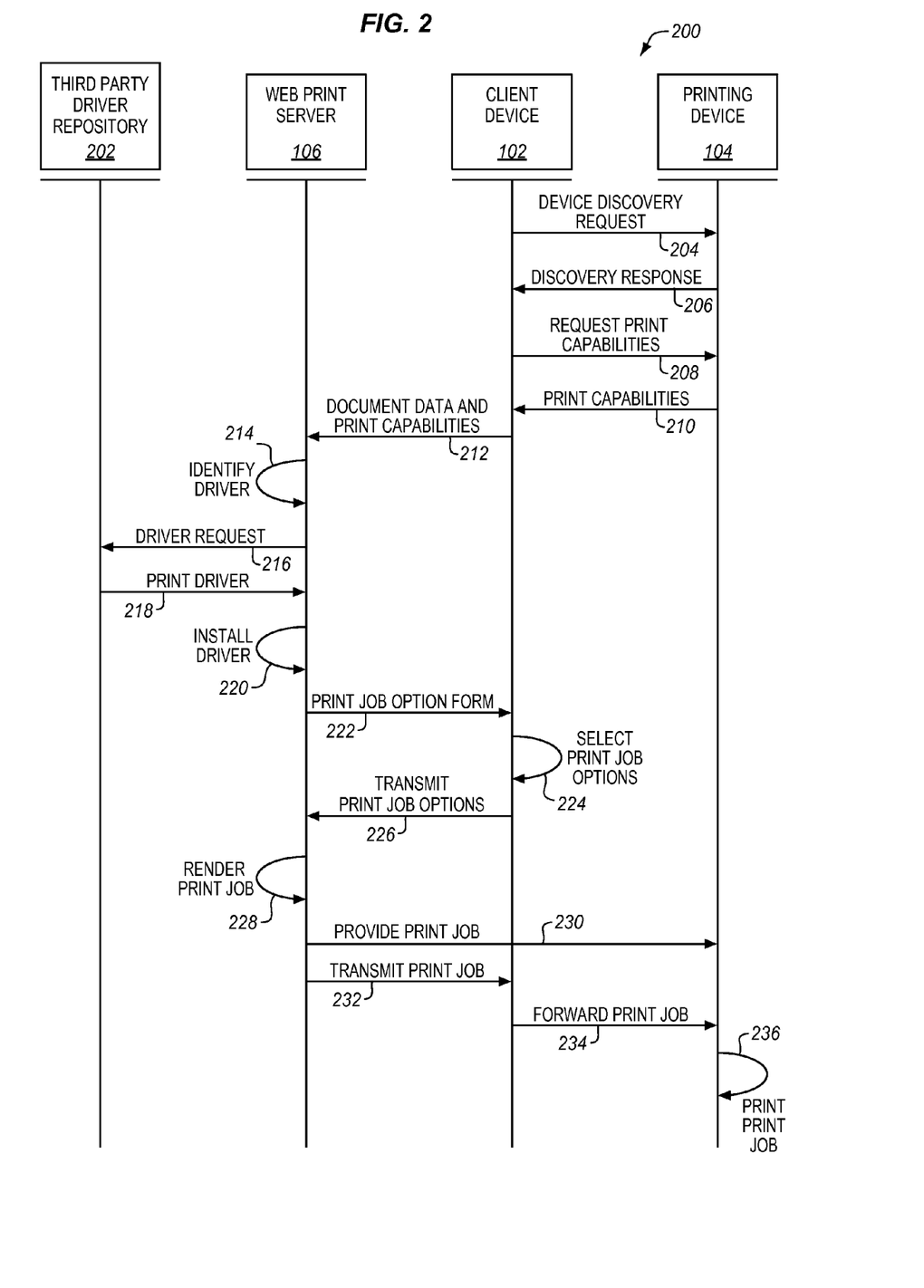
FIG. 2 illustrates an exemplary communication and processing flow in accordance with features and aspects disclosed herein for consistently obtaining and utilizing print capabilities of a printing device across a wide variety of connection topologies.

FIG. 2 illustrates an exemplary communication and processing flow 200 between the devices of printing system 100 of FIG. 1 in accordance with features and aspects disclosed herein for consistently obtaining and utilizing print capabilities 112 of printing device 104 across a wide variety of connection topologies. The communications depicted in FIG. 2 may include more or less communication and/or processing steps as a matter of design choice. Additionally, one skilled in the art will recognize that some communication and/or processing steps may occur in different sequences than illustrated in FIG. 2.

Communication and processing flow 200 of FIG. 2 illustrates how client device 102 may transmit device discovery requests 204 for identify printing device 104 within first network 108 of printing system 100. For example, client device 102 may transmit or broadcast a number of protocols for printer discovery, including simple network management protocol (SNMP), web services discovery (WS-discovery), Bonjour, simple service discovery protocol (SSDP), and/or service location protocol (SLP). One skilled in the art will recognize that a number of methods for printer discovery exist and are known in the art.

Responsive to transmitting device discovery request 204, client device 102 may receive one or more discovery responses 206 from one or more printing devices within first network 108. One such discovery response may identify printing device 104. Client device 102 may transmit a request 208 for print capabilities 112 to printing device 104. Printing device 104 may, for example, read configuration memory 110 to retrieve print capabilities 112, and transmit print capabilities 112 as a response 210 to client device 102. One skilled in the art will recognize that a number of messaging protocols may be used to recover print capabilities 112 from printing device 104. Such protocols may include SNMP requests using standard or private management information bases (MIBs), Web services print (WS-print) requests, or other types of protocols. Additionally, client device 102 may determine that printing device 104 supports specific PDLs such as PostScript or printer control language (PCL).

Responsive to client device 102 receiving print capabilities 112 from printing device 104, client device 102 may transmit print capabilities 112 to web print server 106. Client device may additionally transmit 212 the document data to web print server 106. When transmitting print capabilities 112 and document data to web print server 106, client device 102 may utilize an encryption/decryption module 116 of FIG. 1 to encrypt some or all of the data sent between client device 102 and web print server 106. As web print server 106 may reside on a public network such as the Internet, a user of client device 102 may wish to protect sensitive document data when sending data to web print server 106. In such cases, web print server 106 may utilize its own encryption/decryption module 124 of FIG. 1 for decrypting the document data and/or print capabilities 112 received from client device 102. One skilled in the art will recognize that a number of options exist for encrypting and decrypting data, including advanced encryption standard (AES) implementations, data encryption standard (DES) implementations, and/or secure sockets layer (SSL) implementations.

Responsive to web print server 106 receiving print capabilities 112 from client device 102, web print server 106 may identify a print driver 214 for printing device 104. For example, web print server 106 may utilize the IEEE-ID of printing device 104 and/or the model name for printing device 104 retrieved from print capabilities 112. In some cases, a print driver for printing device 104 may already be installed on web print server 106. For example, client device 102 may have previously utilized web print server 106 for rendering document data for printing on printing device 104. In other cases, web print server 106 may not have a print driver installed for printing device 104. In such cases, web print server 106 may transmit a driver request 216 to a third party driver repository 202. Third party driver repository 202 may be for example, a remote WAS on the internet, or may be a local and/or remote database of drivers available to web print server 106. Some examples of third party driver repository 202 may include www.opendriver.org, www.opendrivers.com, and openprinting.com as well as vendor specific sites such as www.ricoh.com.

Before web print server 106 transmits driver request 216, web print server 106 may translate the IEEE-ID and/or the model name of printing device 104 into a format understood by third party driver repository 202. For example, web print server 106 may translate the model name of printing device 104 into a "foomatic id" format. A "foomatic id" format is used by various driver repositories when identifying printer drivers, such as the Linux Foundation.

Web print server 106 may also utilize a number of protocols when communicating with third party driver repository 202, such as SNMP, TCP (transmission control protocol), UDP (user datagram protocol), FTP (file transfer protocol), or other such protocols understood by third party driver repository 202 as a matter of design choice.

Responsive to receiving driver request 216, third party driver repository 202 may identify and transmit print driver 218 (corresponding with printing device 104) to web print server 106. Web print server 106 may then install 220 the received print driver. In one embodiment, web print server 106 may transmit a print job option form 222 to client device 102. Print job option form 222 may, for example, allow a user of client device 102 to select a set of print job options for printing device 104. The print job options may include a selected set of print capabilities 112 previously identified by client device 102 and subsequently transmitted to web print server 106. By utilizing print capabilities 112 of printing device 104, web server 106 is operable to provide specific print job options in print job option form 222 which are unique to printing device 104. For example, a number of printing devices may be available for web print server 106 to print on, with each printing device including different print capabilities such as paper type, amount of memory available, PDL languages supported, and the like. Furthermore, although some features may be generically available on a family of printing systems, the form generated from device capabilities 112 will be specific to the particular printing device 104.

Responsive to receiving print job option form 222, a user of client device 102 may select 224 one or more print job options using display 118. Client device 102 may then transmit 226 the print job options to web print server 106 for use when rendering 228 the print job. Web print server 106 may render 228 the print job from the document data using the received print job options. After rendering the print job, web print server 106 provides the print job to printing device 104. Providing the print job may occur in a number of ways based on connection topologies used. For example, where there exists a communication pathway between web print server 106 and printing device 104, web print server 106 may provide 230 the print job directly to printing device 104 using communication gateway 120 (or using optional signal path 140). Or, for example, where there is no communication pathway between web print server 106 and printing device 104, web print server 106 may then transmit 232 the print job to client device 102 through gateway 120 (or over optional signal path 138). After client device 102 receives the print job, client device 102 forwards 234 the print job to printing device 104 over first network 108 (or over optional signal path 128). After printing device 104 receives the print job, printing device 104 may utilize print engine 114 to print 236 the print job.

Figure 3:
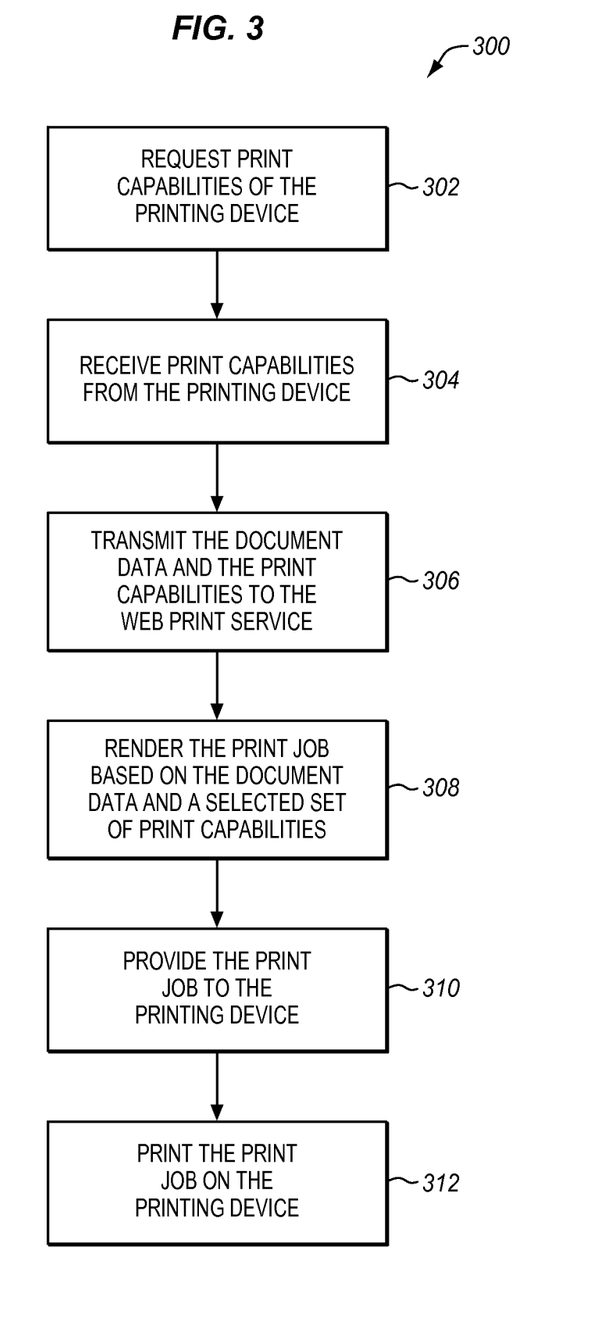
FIG. 3 is a flowchart depicting an exemplary method in accordance with features and aspects disclosed herein for consistently obtaining and utilizing print capabilities of a printing device across a wide variety of connection topologies.

FIG. 3 is a flowchart depicting an exemplary method 300 in accordance with features and aspects disclosed herein for consistently obtaining and utilizing print capabilities of a printing device across a wide variety of connection topologies. Step 302 of method 300 comprises transmitting a request from the client device to the printing device for the print capabilities of a printing device. For example, a client device may transmit a request to one or more printers for print capabilities associated with each printing device. As discussed previously with respect to printing system 100 of FIG. 1 and communication and processing flow 200 of FIG. 2, the request may utilize specific protocols such as SNMP and WS-Print.

Step 304 comprises receiving the print capabilities at the client device from the printing device. The print capabilities may include any number of printer specific capabilities as discussed previously, such as paper type, amount of printer memory, and the like.

Step 306 comprises transmitting document data and the print capabilities to the web printing service from the client device. As discussed previously, a server may provide a web printing service for use by the client device. The document data and/or the print capabilities may be encrypted as a matter of design choice for security purposes before being transmitted to the web print service from the client device. In some cases, the document data and the print capabilities are transmitted to the web printing service separately.

Step 308 comprises rendering the print job using the web print service based on the document data and a various print job options (e.g., a selected set of the print capabilities). Step 308 may also include the web print service decrypting the document data and/or the print capabilities prior to rendering.

Step 310 comprises the web print service providing the print job to the printing device. As discussed previously, in some cases the web printing service will provide the print job directly to the printing device. In other cases the web printing service will transmit the print job to the client device. When transmitting the print job to the client device, the web print service may encrypt the print job. After receiving the print job, the client device may decrypt the print job (if necessary) and then forward the print job to the printing device for printing. Step 312 comprises printing the print job on the printing device.

Figure 4:
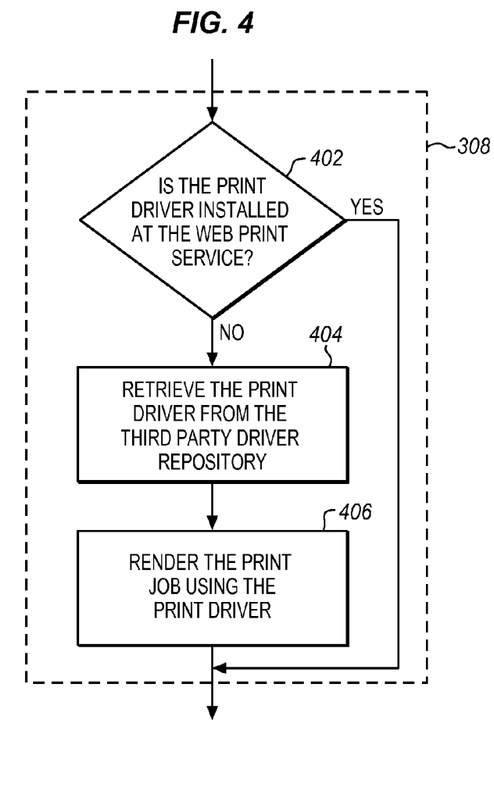
FIGS. 4 and 5 are flowcharts depicting exemplary additional details of the method of FIG. 3.

FIG. 4 is a flowchart depicting exemplary additional details of step 308 the method of FIG. 3. Step 402 of FIG. 4 comprises the web print service determining if a print driver is installed. After the web print service receives the print capabilities in step 306 of FIG. 3, the web print service may attempt to determine if a print driver is installed for the printing device as identified by the print capabilities. As discussed previously, the print capabilities may include an IEEE-ID and/or model name for the printing device. If the print driver is installed, then step 408 is performed as detailed below.

Step 404 comprises the web print service retrieving the print driver from a third party driver repository. As discussed previously, retrieving the print driver may include transmitting the IEEE-ID and/or the model name of the printing device, and may include translating the IEEE-ID and/or model name of the printing device into a format understood by the third party driver repository.

Step 406 comprises the web print service installing the retrieved print driver within the web print service. Step 408 comprises rendering the print job using the installed printer driver.

Figure 5:
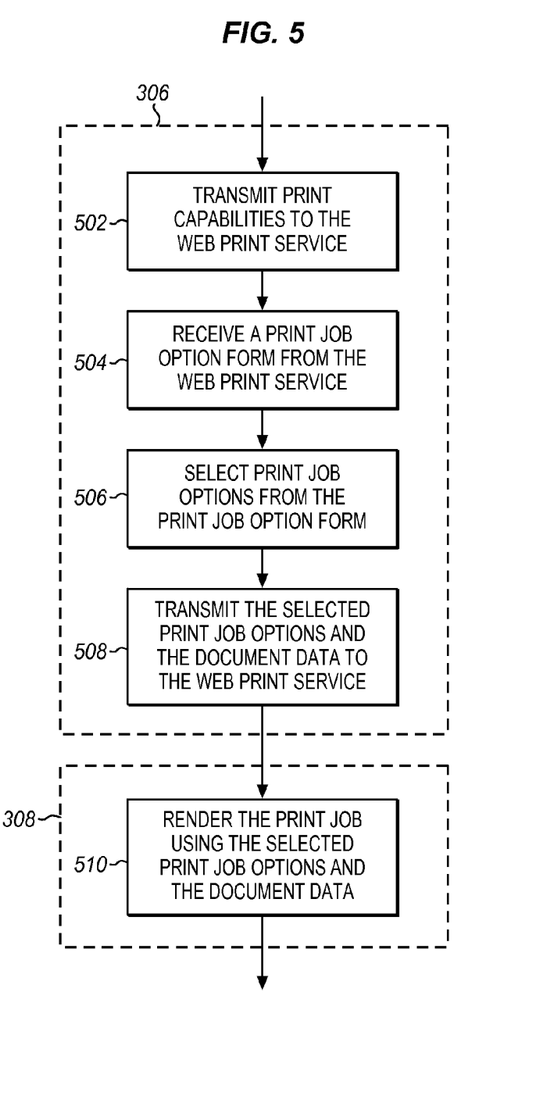

FIG. 5 is a flowchart depicting exemplary additional details of the method of FIG. 3. Step 502 comprises transmitting the print capabilities from the client device to the web print service. After receiving the print capabilities, the web print service may generate a print job option form from the print capabilities. The print job option form may include various print job options available for the specific printing device which corresponds with the print capabilities previously received by the web print service.

Step 504 comprises receiving at the client device, the print job option form from the web print service. Step 506 comprises selecting, within the client device, various print job options from the print job option form. A client device may receive and display the print job option form to a user. The user then may then select specific print job options for a selected printing device as a matter of user preference. The user may, for example, wish to print the document data on both sides of ledger sized paper within the printing device, or wish to select some other print capabilities of the printing device.

Step 508 comprises transmitting the print job options and the document data from the client device to the web print service. Step 510 comprises rendering the print job based on the selected print job options and the document data.

FIGS. 3-5 depict an exemplary method and additional details in order to teach one skilled in the art how to make and use the invention disclosed herein. One skilled in the art will recognize that the steps illustrated in FIGS. 3-5 may be expanded or combined in various ways as a matter of design choice. Also, one skilled in the art will recognize that the steps illustrated in FIGS. 3-5 may be embodied as programmed instructions executable by a processing system, as programmable logic, and implemented by the various embodiments, for example, with respect to printing system 100 of FIG. 1 and by other printing systems operable to perform the functionality disclosed for printing system 100 herein.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc.

Figure 6:
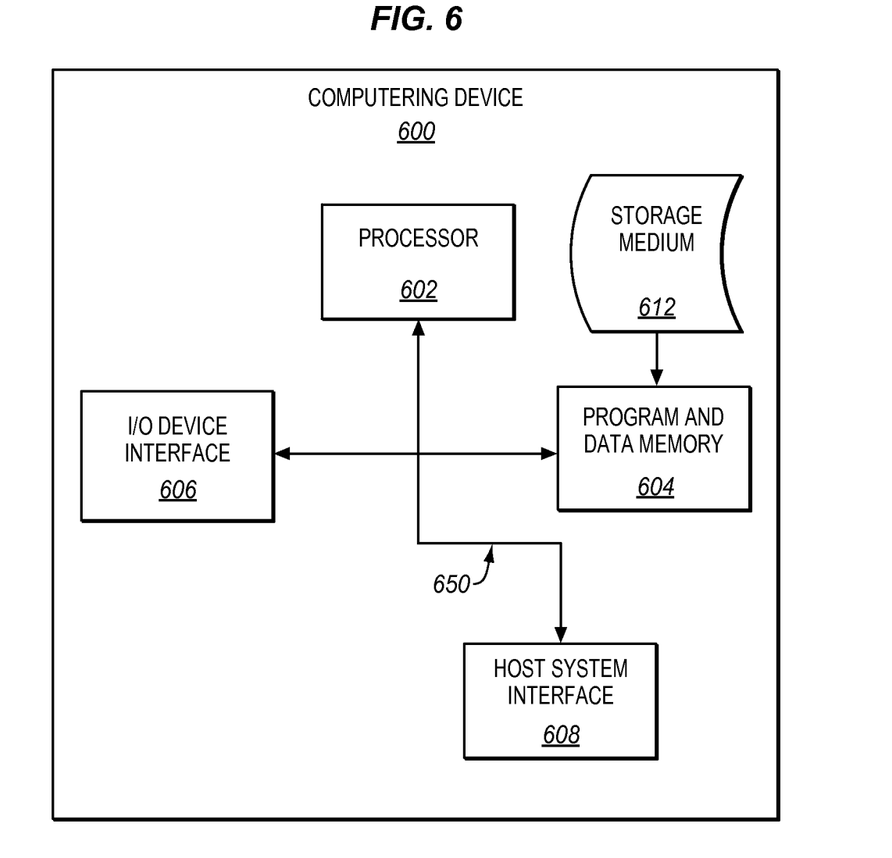
FIG. 6 is a block diagram on an exemplary computing device in accordance with features and aspects disclosed herein for executing programmed instructions to consistently obtain and utilize print capabilities of a printing device across a wide variety of connection topologies.

FIG. 6 is a block diagram depicting a computing device 600 such as a server adapted to provide features and aspects hereof by executing programmed instructions and accessing data stored on a computer readable storage medium 612.

Furthermore, embodiments of the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the computer, instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computing device 600 suitable for storing and/or executing program code will include at least one processor 602 coupled directly or indirectly to memory elements 604 through a system bus 650. The memory elements 604 can include local memory employed during actual execution of the program code, bulk storage, and cache memories which provide temporary storage of at least some program code in order to reduce the number of times code must be retrieved from bulk storage during execution Although specific embodiments were described herein, the scope of the invention is not limited to those specific embodiments. The scope of the invention is defined by the following claims and any equivalents thereof.

We claim:

1. A method for printing a print job on a printing system, the printing system including a client device and a web printing service (WPS), the method comprising:
    transmitting a request for print capabilities of a printing device from the client device to the printing device;
    receiving a response at the client device from the printing device for the requested print capabilities of the printing device, wherein the response includes installable print options for the printing device;
    transmitting the installable print options for the printing device from the client device to the WPS;
    receiving a print job option form at the client device from the WPS, the print job option form based on the installable print options;
    selecting a set of the installable print options from the print job option form at the client device;
    transmitting the selected set of the installable print options and the document data to the WPS from the client device;
    rendering a print job at the WPS based on the document data and the selected set of the installable print options for the printing device;
    providing the print job to the printing device; and
    printing the print job at the printing device based on the selected set of the installable print options.

2. The method of claim 1 wherein the client device and the printing device are communicatively coupled within a first network, wherein the WPS is a web application server on a second network, and wherein the WPS and the printing device are not directly communicatively coupled.

3. The method of claim 2 wherein providing the print job to the printing device further comprises:
    transmitting the print job from the WPS to the client device; and
    forwarding the print job from the client device to the printing device.

4. The method of claim 1 further comprising:
    determining that a printer driver is not installed at the WPS for the printing device;
    retrieving the printer driver from a third party driver repository; and
    installing the printer driver at the WPS,
    wherein rendering the print job at the WPS further comprises:
        rendering the print job at the WPS using the printer driver.

5. The method of claim 4 wherein retrieving the printer driver from the third party driver repository further comprises:
    identifying at least one of a model name and an Institute of Electrical and Electronic Engineers identification number (IEEE-ID) of the printing device from the response to the request for the print capabilities; and
    transmitting the at least one model name and the IEEE-ID in a driver request to the third party driver repository.

6. The method of claim 1
    wherein transmitting the selected set of the installable print options and the document data further comprises:
        transmitting the document data in an encrypted format, and
    wherein providing the print job to the printing device further comprises:
        providing the print job in an encrypted format.

7. A method for printing a print job on a printing system, the printing system including a client device and a web printing service (WPS), the method comprising:
    transmitting, from the client device to a printing device, a request for print capabilities of the printing device, wherein the client device and the printing device reside within a first network;
    receiving a response at the client device from the printing device for the requested print capabilities of the printer, wherein the response includes installable print options for the printing device;
    transmitting, from the client device, the installable print options for the printing device to the WPS, wherein the WPS resides within a second network;
    receiving, at the client device, a print job option form from the WPS, the print job option form based on the installable print options;

selecting, at the client device, a set of the installable print options from the print job option form;

transmitting, from the client device, the selected set of the installable print options and the document data to the WPS;

rendering a print job at the WPS based on the document data and the selected set of the installable print options for the printing device;

transmitting the print job from the WPS to the client device;

forwarding the print job from the client device to the printing device; and printing the print job at the printing device based on the selected set of the installable print options.

8. The method of claim 7 further comprising:

determining that a printer driver is not installed at the WPS for the printing device;

retrieving the printer driver from a third party driver repository; and installing the printer driver at the WPS, wherein rendering the print job at the WPS further comprises:

rendering the print job at the WPS using the printer driver.

9. The method of claim 8 wherein retrieving the printer driver from the third party driver repository further comprises:

identifying at least one of a model name and an Institute of Electrical and Electronic Engineers identification number (IEEE-ID) of the printing device from the response to the request for the print capabilities;

transmitting the at least one model name and the IEEE-ID in a driver request to the third party driver repository; and receiving the printer driver from the third party driver repository responsive to the driver request.

10. A printing system, the system comprising:

a web print server; and a client device coupled with the web print server, wherein the client device is operable to transmit a request to a printing device coupled with the client device for print capabilities of the printing device, wherein the client device is further operable to receive a response from the printing device for the requested print capabilities of the printing device, wherein the response includes installable print options for the printing device, wherein the client device is further operable to transmit the installable print options for the printing device to the web print server, wherein the client device is further operable to receive a print job option form from the web print server, the print job option form based on the installable print options, wherein the client device is further operable to receive a selection of the set of the installable print options using the print job option form, wherein the client device is further operable to transmit the selected set of the installable print options and the document data to the web print server, wherein the web print server is operable to render a print job for the printing device based on the document data and the selected set of the installable print options for the printing device, wherein the web print server is further operable to provide the print job to the printing device, and wherein the printing device is operable to print the print job based on the selected set of the installable print options.

11. The printing system of claim 10 wherein the client device and the printing device reside within a first network, wherein the web print server comprises a web application server on a second network, and wherein the web print server and the printing device are not directly communicatively coupled.

12. The printing system of claim 11 wherein the client device is communicatively coupled to the web print server on the second network and communicatively coupled to the printing device on the first network, wherein the web print server is further operable to transmit the print job to the client device over the second network, and wherein the client device is further operable to forward the print job from the web print server to the printing device over the first network.

13. The printing system of claim 11 further comprising:

a communication gateway communicatively coupled to the first network and the second network, wherein the client device is further operable to transmit the document data and the selected set of the installable print options to the web print server over the first network to the second network through the communication gateway, wherein the web print server is further operable to transmit the print job to the client device over the second network to the first network through the communication gateway, and wherein the client device is further operable to forward the print job from the web print server to the printing device.

14. The printing system of claim 10 wherein the web print server is further operable to determine that a printer driver is not installed for the printing device, wherein the web print server is further operable to retrieve the printer driver from a third party driver repository, wherein the web print server is further operable to install the printer driver, and wherein the web print server is further operable to render the print job using the printer driver.

15. The printing system of claim 14 wherein the web print server is further operable to identify at least one of a model name and an Institute of Electrical and Electronic Engineers identification number (IEEE-ID) of the printing device, wherein the web print server is further operable to transmit the at least one model name and the IEEE-ID in a driver request to the third party driver repository, and wherein the web print server is further operable to receive the printer driver from the third party driver repository responsive to the driver request.

16. The printing system of claim 10 wherein the client device is further operable to transmit the print data to the web print server in an encrypted format, and wherein the web print server is further operable to provide the print job in an encrypted format.

17. A non-transitory computer readable medium tangibly embodying programmed instructions which, when executed by a computing device, are operable to perform a method of providing rendering services for a client device, the method comprising:

receiving, at the computing device, document data and a rendering request from the client device;

receiving, at the computing device, print capabilities for a printing device from the client device, wherein the print capabilities include installable print options for the printing device;

generating a print job option form at the computing device based on the installable print options;

transmitting, from the computing device, the print job option form to the client device for selecting a set of the installable print options for the print job; and receiving, at the computing device, the selected set of the installable print options from the client device for rendering the print job;

rendering, at the computing device, a print job based on the document data and the selected set of the installable print options; and providing, from the computing device, the print job to the printing device for printing the print job based on the selected set of the installable print options.

18. The non-transitory computer readable medium of claim 17 wherein the step of providing the print job to the printing device further comprises:

transmitting the print job from the computing device to the client device to allow the client device to forward the print job to the printing device.

19. The non-transitory computer readable medium of claim 17, wherein the method further comprises:

determining, at the computing device, that a printer driver is not installed for the printing device;

retrieving, at the computing device, the printer driver from a third party repository; and installing the printer driver at the computing device, wherein rendering the print job at the computing device further comprises:

rendering the print job at the computing device using the printer driver.

20. The non-transitory computer readable medium of claim 19 wherein the step of retrieving the printer driver from the third party driver repository further comprises:

identifying at least one of a model name or an Institute of Electrical and Electronic Engineers identification number (IEEE-ID) of the printing device from the response to the request for the print capabilities;

transmitting the at least one model name or the IEEE-ID in a driver request to the third party driver repository; and receiving the printer driver from the third party driver repository responsive to the driver request.

* * * * *